United States Patent [19]
Mortner

[11] Patent Number: 5,553,454
[45] Date of Patent: Sep. 10, 1996

[54] COMPRESSED AIR ENGINE SYSTEM AND METHOD FOR GENERATING ELECTRICAL ENERGY FROM THE CONTROLLED RELEASE OF COMPRESSED AIR

[76] Inventor: Sol E. Mortner, 345 Heimstrand Ct., Saddlebrook, N.J. 07663

[21] Appl. No.: 406,731

[22] Filed: Mar. 20, 1995

[51] Int. Cl.$^6$ ........................................... F16D 31/02
[52] U.S. Cl. ........................ 60/409; 60/415; 60/416; 290/52
[58] Field of Search .................... 60/407, 409, 415, 60/416; 290/52; 415/202

[56] References Cited

U.S. PATENT DOCUMENTS

| | | | |
|---|---|---|---|
| 800,485 | 9/1905 | Rhoades | 415/202 |
| 2,444,415 | 7/1948 | Beeson | 290/52 |
| 2,591,641 | 4/1952 | Troendle | 60/416 |
| 2,642,543 | 6/1953 | Teague et al. | 290/52 |
| 2,794,129 | 5/1957 | Palmenberg et al. | 290/52 |
| 3,765,180 | 10/1973 | Brown | 60/370 |
| 4,124,978 | 11/1978 | Wagner | 60/410 |
| 4,208,592 | 6/1980 | Leibow et al. | 60/407 |
| 4,478,304 | 10/1984 | Delano | 180/165 |
| 4,651,525 | 3/1987 | Cestero | 60/416 |

Primary Examiner—F. Daniel Lopez
Attorney, Agent, or Firm—John D. Gugliotta

[57] ABSTRACT

A system and method is provided for generating electrical energy by operatively connecting a generator to a drive shaft which is rotated axially when fan turbines connected to the drive shaft are rotated. The turbines are rotated by directing the release of air under pressure toward a plurality of blade surfaces of the turbines. The air under pressure is supplied from a plurality of storage tanks which are connected to one of a pair of pressure guide rings, which guide rings receive air under pressure from one or more connected tanks and direct the air through an output duct and toward the blade surfaces. The flow of air under pressure is controlled by a power regulator and controller which monitors the power output from the generator and transmits electrical signals to adjust the open and closed positioning of a tank output valve on each of the plurality of tanks. Alternatively, the drive shaft may be connected to a water pump, evaporating device, or the drive wheels of a motor vehicle for pollution-free powering of that device through the controlled release of compressed air in the plurality of tanks.

4 Claims, 3 Drawing Sheets

5,553,454

COMPRESSED AIR ENGINE SYSTEM AND METHOD FOR GENERATING ELECTRICAL ENERGY FROM THE CONTROLLED RELEASE OF COMPRESSED AIR

BACKGROUND OF THE INVENTION

1. Field of the Invention

The present invention relates generally to a system and method for generating electrical energy from the controlled release of compressed air and, more particularly, to a system and method for generating electrical energy with a generator which is operatively connected to an axially rotating drive shaft, which drive shaft is rotated by rotating a mounted fan turbine with a controlled release of air under pressure from a plurality of refillable storage tanks containing the air under pressure.

2. Description of the Related Art

As is well-known in the art, internal combustion engines for powering motor vehicles and fossil-burning power plants used in energy producing operations have been under attack for many years because of their inherent characteristics which produce air pollutants and other pollutants. Steps have been therefore taken to increase the combustion efficiency and to filter the exhaust from these power plants with a view to "saving" the atmosphere through more efficient and cleaner burning. The relative success of such operations has, however, been slow and limited because of the many problems which arise, including adding to costs of manufacturing a clean engine. One of the approaches taken in the production of a completely clean power plant is the design of the air engine which is, of course, completely clean since there are absolutely no combustion gasses to contend with. However, design in this area has been somewhat limited because of the reduced power output capable for such engines and because of their somewhat inefficient and complex operation. The air engine has therefore been used in some cases as an auxiliary power plant with a combustion engine or it has been abandoned in favor of other systems because of the auxiliary power needed to maintain adequate supply of air pressure for the system.

Numerous attempts have been made to correct for the foregoing problems. For instance, U.S. Pat. No. 4,124,978, issued in the name of Wagner, discloses a compressed air engine having specially designed cylinder heads and piston configurations in order to reduce friction and maximize the applications of air from a pressurized air source. Further, U.S. Pat. No. 3,765,180, issued in the name of Brown, teaches a compressed air engine having an auxiliary air compressor for building up to a minimum a predetermined air pressure in a compressed air supply tank which feeds air through an engine RPM control valve for the engine piston. However, a compressed air engine made in accordance with these references is associated with several drawbacks. For example, the use of a piston to drive a crankshaft in each of these references generates friction and requires numerous moving parts, thereby subjecting these references to problems of inefficiency, malfunction, and excessive manufacturing costs.

Consequently, a need has been felt for providing a compressed air engine and system for generating electrical energy that eliminates the use of a piston to drive a crankshaft and otherwise minimizes emission of harmful pollutants, friction and manufacturing costs.

SUMMARY OF THE INVENTION

It is therefore an object of the present invention to provide an improved compressed air engine which axially rotates a fan turbine having a plurality of blade surfaces with a controlled release of air under pressure from a plurality of refillable storage tanks containing the air under pressure, wherein the released air is directed against the blade surfaces, thereby to axially rotate the fan turbine and an associated fixedly mounted drive shaft of the compressed air engine.

It is another object of the present invention to provide a system and method for generating electrical energy by operatively connecting a generator to the axially rotating drive shaft and controlling the release of air under pressure from the plurality of refillable storage tanks according to a power measurement of electrical energy generated by the generator.

It is a feature of the present invention to fixedly mount a plurality of refillable storage tanks to an elongated frame through which the drive shaft extends.

It is a further feature of the present invention to direct the controlled release of air under pressure from the plurality of air tanks through a guide ring duct located in a guide ring which is fixedly mounted to the cylindrical frame and which receives air under pressure from the plurality of air tanks.

Briefly described according to one embodiment of the present invention, a system and method is provided for generating electrical energy by operatively connecting a generator to a drive shaft which is rotated axially when fan turbines connected to the drive shaft are rotated. The fan turbines are rotated by directing the release of air under pressure toward a plurality of blade surfaces of the turbines. The air under pressure is supplied from a plurality of storage tanks which are connected to one of a pair of pressure guide rings, which guide rings receive air under pressure from one or more connected tanks and direct the air through an output duct and toward the blade surfaces. The flow of air under pressure is controlled by a power regulator and controller which monitors the power output from the generator and transmits electrical signals to adjust the open and closed positioning of a tank output valve on each of the plurality of tanks. Alternatively, the drive shaft may be connected to a water pump, evaporating device, or the drive wheels of a motor vehicle for pollution-free powering of that device through the controlled release of compressed air in the plurality of tanks.

In accordance with a preferred embodiment, a system is provided for the generation of electrical energy using a source of air under pressure, wherein the system comprises: generator means for generating electrical energy, wherein the generator means is fixedly mounted to a mounting frame; power monitoring means for monitoring a power output of the generator means; a drive shaft rotatably mounted to the mounting frame and operatively connected to the generator means, such that the generator means generates electrical energy when the drive shaft is axially rotated; turbine means having a plurality of blade surfaces and fixedly mounted to the drive shaft for axially rotating the drive shaft when the turbine means is axially rotated; a plurality of tanks fixedly mounted about the frame, each of the plurality of tanks having a tank input port for introducing aid under pressure and a tank output port for releasing the air under pressure in a controlled manner toward the turbine means, thereby to axially rotate the turbine means; and controller means for controlling the release of the air pressure in the controlled manner toward the turbine means, according to the monitored power output from the generator means, whereby the controller means is operatively connected to the generator means and to each of the tank output ports.

An advantage of the present invention is that it is a clean source of electrical energy.

Another advantage of the present invention is that it is a transportable source of electrical energy.

Another advantage of the present invention is that it may be utilized as a pollution-free compressed air engine to power automobiles and other mechanical devices.

Another advantage of the present invention is that it can be used to generate electrical power in the megawatt range.

Another advantage of the present invention is that the plurality of tanks containing the air supply may be refilled with air from a high-speed compressor, generally more quickly than even recharging of an electrical battery source.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
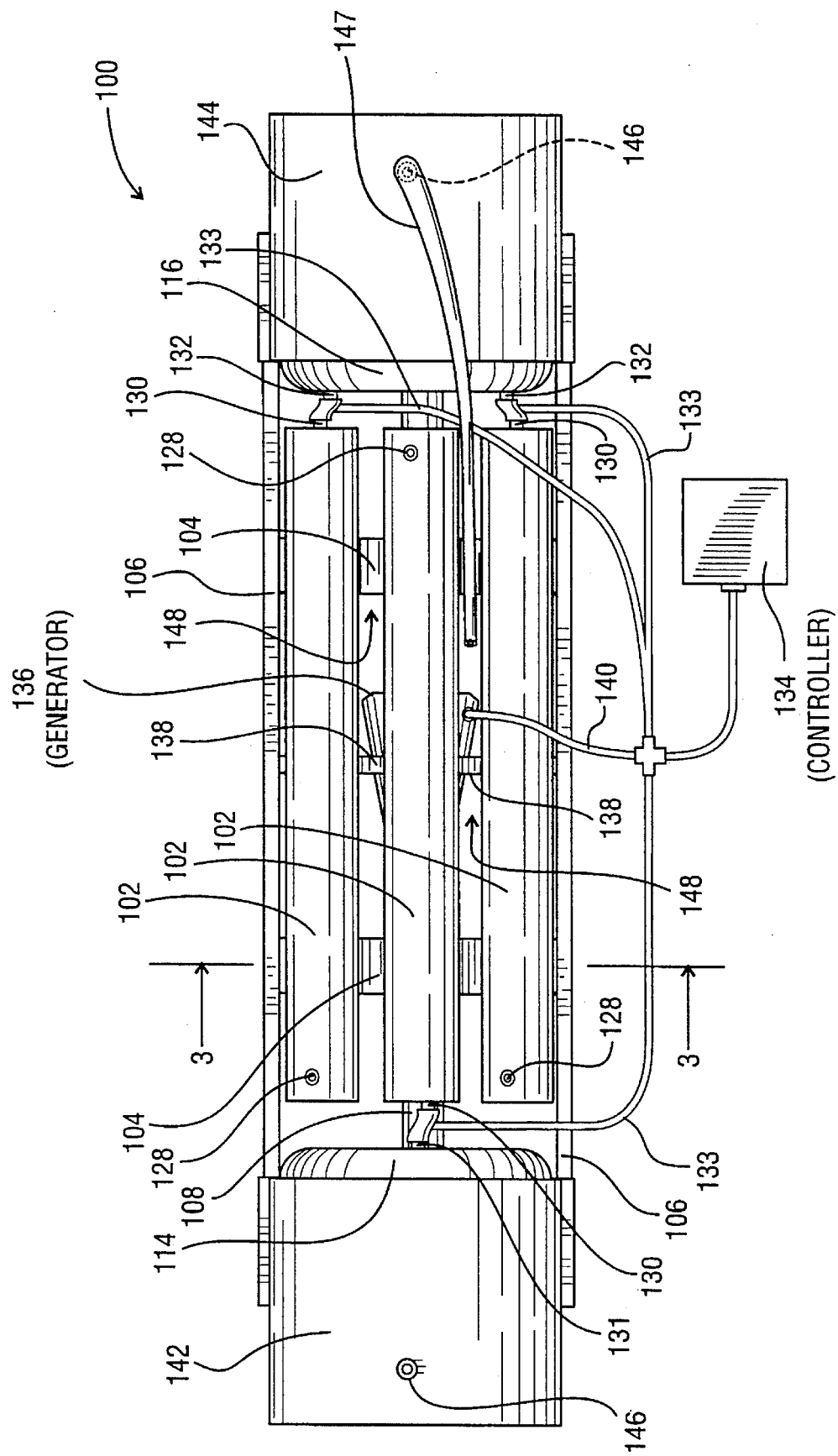
FIG. 1 is a side elevational view of a compressed air system for generating electrical energy according to a preferred embodiment of the present invention.
Figure 2:
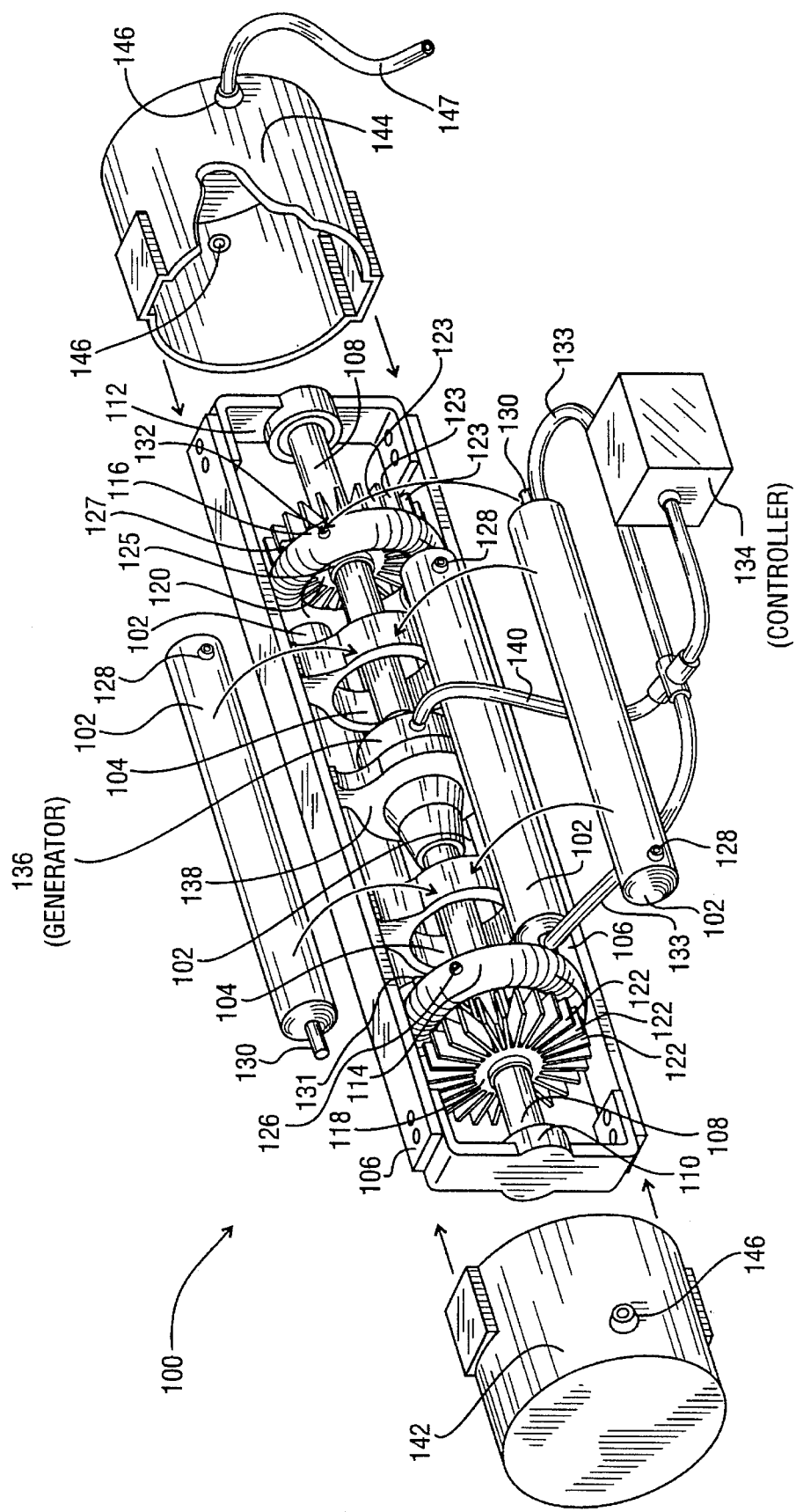
FIG. 2 is a partially exploded perspective view of a compressed air system for generating electrical energy according to a preferred embodiment of the present invention.

Referring now to FIGS. 1 and 2, a compressed air system 100 for generating electrical energy is shown, according to the present invention. A plurality of tanks 102 containing air under pressure are mounted about circular support brackets 104 of an elongated mounting frame 106, to which frame a solid cylindrical drive shaft 108 is rotatably mounted within endposts 110, 112. In a preferred embodiment, the drive shaft 108 is mounted within the endposts 110, 112 with a conventional roller-bearing mounting (not shown), thereby to minimize friction between the drive shaft 108 and the endposts 110, 112, to encourage low friction rotation of the drive shaft 102 within the endposts 110, 112. A pair of pressure guide rings 114, 116 are fixedly mounted within the mounting frame 106 adjacent to each end of each mounted tank 102. A pair of fan turbines 118, 120 having a plurality of blade surfaces 122, 123 is fixedly mounted to the cylindrical drive shaft 108, preferably with a collar 124, 125, respectively, thereby to make each fan turbine an integral portion of the drive shaft 108, such that axial rotation of the turbines 118, 120 about the axis of the drive shaft 108 rotates the drive shaft within the conventional roller-bearing mounting. Each turbine 118, 120 is fixedly mounted to the drive shaft 108 adjacent each pressure guide ring 114, 116, respectively, on the opposing side of the side of each pressure guide ring 114, 116 which is adjacent the plurality of tanks 102.

As shown in FIG. 2, the pressure guide ring 114 has an integral guide ring output duct 126 through which air from within the pressure guide ring 114 is expelled in a directed manner against the plurality of blade surfaces 122. FIG. 2 shows the perspective view of the integral guide ring output duct 126 which directs expelled air to rotate the turbine 118 in a clockwise direction. Similarly, the pressure guide ring 116 has an integral guide ring output duct 127 through which air from within the pressure guide ring 116 is expelled against the plurality of blade surfaces 123, thereby to rotate the turbine 120 in the same direction as the rotation of the turbine 118. A preferred embodiment of the present invention utilizes a single guide ring output duct on each pressure guide ring, thereby to maintain the pressure of released air from the single output duct by focussing the expulsion of released air through one duct rather than a plurality of ducts in the same pressure guide ring.

In a preferred embodiment, the plurality of tanks 102 are fixedly mounted to the circular support brackets 104 in a removable manner with suitable mounting means such as adjustable straps or clamps (not shown). Another preferred embodiment welds or otherwise permanently mounts the plurality of tanks to the circular support brackets 104. The tanks should be fixedly mounted to the frame in a manner to eliminate movement of the tanks during operation of the compressed air engine system.

A preferred embodiment of each tank 102 is cylindrical and manufactured of a metal material, such as titanium, steel, or a lightweight duraluminum aircraft material, thereby to be lightweight and of sufficient strength to contain pressurized air at a pressure preferably approximating 2100 pounds per square inch (p.s.i.). Each tank 102 is equipped with a tank input valve 128 through which to refill the tank with pressured air from an external high-speed compressor (not shown). A preferred embodiment of the tank input valve 128 is a conventional solenoid valve, which solenoid valve permits pressurized air from the external high speed compressor to enter the tank 102, but prohibits unwanted release of the pressurized air.

Each tank 102 is also equipped with a tank output valve 130 through which the pressured air is controllably released from the tank 102. A preferred embodiment of the tank output valve 130 is a conventional solenoid valve. Preferably, the position of each tank output valve 130 is variably adjustable between a closed and a fully open position. The position of each tank output valve 130 is electronically monitored and controlled with electronic signals transmitted through control wires 133 which connect each output valve 130 to a power regulator and controller 134, described below. To interconnect each tank 102 to the pressure guide ring 114 and 116, the tank output valve 130 is operatively connected to one of a plurality of guide ring input valves 131, 132, selectively located integral to the guide rings 114, 116, respectively.

The guide rings 114, 116 are preferably manufactured of the same material as each tank 102, thereby to be lightweight and of sufficient strength to contain air released from the plurality of tanks 102, and particularly to withstand pressures exceeding 2100 p.s.i., which pressures may be experienced when receiving air from more than one tank 102 at the same time, wherein each tank 102 preferably contains pressurized air at a pressure approximating 2100 p.s.i., as previously described.

A preferred embodiment of the present invention mounts a generator 136 within a generator support bracket 138, which bracket is affixed to the elongated mounting frame 106. The generator support bracket 138 holds the generator 136 in a stationary position relative to the drive shaft 108, which drive shaft preferably extends through the generator 136 and rotates therewithin. A preferred embodiment of the generator 136 is a high-capacity electric generator which has a maximum power output approximating 100 Kilowatts, although generators of other sizes are contemplated. The generator 136 generates electrical energy in a conventional manner, not to be claimed or described, from the rotation of the drive shaft 108. The power regulator and controller 134 is electrically connected to the generator 136 through a hardwire 140, thereby to monitor the power output of the generator 136. The power output of the generator 136 is monitored and then controlled by controlling the speed of the rotation of the fan turbines 118, 120 and therefore the drive shaft 108. The speed in revolutions per minute of the rotation of the turbines 118, 120 is controlled by adjusting the flow of air expelled from the pair of pressure guide rings 114, 116, particularly through the guide ring output ducts 126, 127, as shown in FIG. 2. The flow of air expelled from the pair of pressure guide rings 114, 116 is adjusted by opening and closing the tank output valves 130 according to electrical control signals transmitted through the control wires 133 from the power regulator and controller 134.

Further shown in FIGS. 1 and 2, a preferred embodiment of the present invention slidably mounts a turbine housing 142, 144 over and around the frame 106 and each of the turbines 118, 120, respectively, such that the turbine housing 142, 144 abuts against the pressure guide ring 114, 116, respectively, thereby to protectively encase the guide ring output ducts 126, 127 and respective fan turbine 118, 120 within the turbine housing 142, 144 without restricting the rotation of the turbine 118, 120 and drive shaft 108. A plurality of air venting ducts 146, preferably in opposing positions on an end of the each turbine housing 142, 144, permit expulsion of air that is released into the turbine housing 142, 144 from the pressure guide rings 114, 116, particularly through the guide ring output ducts 126, 127, as shown. In a preferred embodiment, a cooling conduit 147, preferably manufactured of a rubber, plastic, or metal material, is slipped over the air venting duct 146, as shown in FIGS. 1 and 2, thereby to direct the expulsion of air from the air venting duct 146 through the cooling conduit 147, to be aimed at the generator 136 for cooling purposes. In another preferred embodiment, the temperature of the generator 136 is monitored by the power regulator and controller 134, which controller 134 transmits an electrical signal to stop the generator when the temperature of the generator exceeds a predetermined value.

Figure 3:
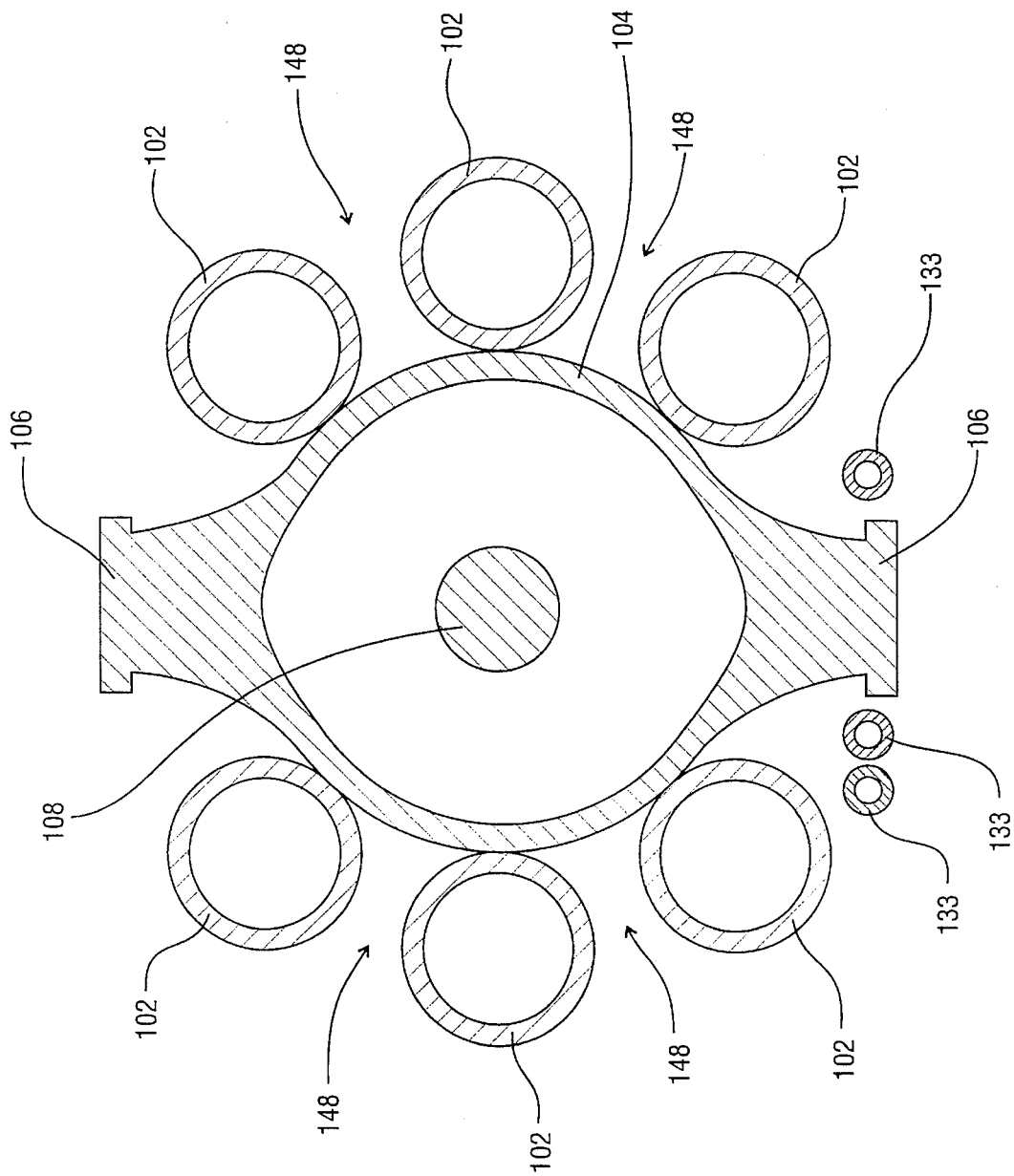
FIG. 3 is a cut-away view of the compressed air system for generating electrical energy, taken along the line 3—3 of FIG. 1.

In FIG. 3, a cut-away view of the compressed air system 100 for generating electrical energy, taken along the line 3—3 of FIG. 1, better illustrates the circular support brackets 104 of the frame 106, with the plurality of tanks 102 mounted thereupon and the drive shaft 108 extending therethrough. For simplicity of illustration, six tanks 102 are shown in FIG. 3, although any number of tanks, even of different sizes and diameters, are contemplated. In a preferred embodiment, a gap 148, preferably approximately 0.25 inches wide, is maintained between any two mounted tanks 102 thereby to permit dissipation of heat energy therethrough from the generator 136 for cooling of the generator 136. The tanks 102 are hollow to contain pressurized air therein. The control wires 133 are shown as part of the cross-sectional cut.

2. Operation of the Preferred Embodiment

In the method of the present invention, initial electronic signals from the power regulator and controller 134, transmitted through the control wires 133, electronically open the tank output valve 128 of each of one tank 102 which is connected to each of the pressure guide rings 114, 116, through the guide ring input valves 131, 132, thereby to fill the pressure guide rings 114, 116 in order to expel the air, through the guide ring output ducts 126, 127. The ducts are designed to enhance the concentrated air flow against the plurality of blade surfaces 122, 123, thereby to overcome inertia of the stationary turbines 118, 120 and to urge the fan turbines, and thereby the drive shaft 108, in a rotational direction that permits the generator 136 to generate electrical energy in a conventional manner from the rotation of the drive shaft 108. The power regulator and controller 134 monitors the power output from the generator 136 and adjusts the tank output valves 128 of each of the plurality of tanks 102 to increase the air flow in cubic feet per second from each of the tanks 102 into the respective connected pressure guide ring 114, 116 when increased power is desired. Similarly, the power regulator and controller 134 adjusts the tank output valves 128 of each of the plurality of tanks 102 to decrease the air flow in cubic feet per second from each of the tanks 102 into the respective connected pressure guide ring 114, 116 when decreased power is desired.

When the air supply of one tank 102 is depleted, the tank output valve 128 of another tank 102 will be opened by the electrical signal from the power regulator and controller 134 in order to continue supplying air to the interconnected pressure guide ring. The pressure guide rings 114, 116 help to retain air conservation in the plurality of tanks 102, thereby to maximize the useful time period of the plurality of tanks 102 before the tanks must be replenished. When the supply of air is depleted from the plurality of tanks 102, the tanks 102 may remain on the frame 106 while being refilled with the high-speed compressor. Alternatively, the empty tanks 102 may be removed from the frame 106 and new filled tanks may be connected to the pressure guide ring in place of the removed empty tank.

Thus, there has been shown and described an system for generating electrical energy from the controlled release of compressed air, which controlled release of compressed air urges turbines and an associated drive shaft into a rotational direction for use by an electrical generator, which system fulfills all the objects and advantages sought therefore. Many changes, modifications, variations and other uses and applications of the subject invention will, however, become apparent to those skilled in the art after considering this specification and the accompanying drawings which disclose a preferred embodiment thereof.

For instance, additional turbines may be fixedly mounted to the drive shaft, with additional pressure guide rings and additional guide ring ducts, thereby to enhance the rotational power that may be obtained from the turbines and the drive shaft in the system. Also contemplated is the attachment of a flywheel to the drive shaft, thereby to enhance the rotational power of the turbines and the drive shaft while conserving the air supply in the plurality of tanks. Further contemplated is directly connecting the drive shaft to the drive wheels of a motor vehicle for pollution-free powering of that motor vehicle. Further contemplated is the use of the present invention to power an evaporator in the distillation of sea water into fresh water. Further contemplated is the use of the present invention to power a water pump for storage and agricultural applications. Further contemplated is the use of the present invention for generation of electrical energy in a lightweight aircraft having a propeller, wherein the propellor drives the drive shaft of the present invention. All such changes, modifications, variations and other uses and applications which do not depart from the spirit and scope of the invention are deemed to be covered by the invention which is limited only by the claims which follow.

What is claimed is:

1. A compressed air engine having a source of air under pressure, comprising:

a frame having support beams and endports;

a drive shaft rotatably mounted within said endports of said frame;

turbine means fixedly mounted to said drive shaft for axially rotating said drive shaft when said turbine means is rotated;

ringed guide means for receiving pressurized air through a plurality of guide input ports to be directed through a guide output port in operative direction to axially rotate said turbine means which is fixedly mounted to said drive shaft, thereby to operatively drive said drive shaft, wherein said ringed guide means is fixedly mounted within said frame with said drive shaft passing therethrough;

a plurality of tanks mounted about said frame at said support beams, each of said plurality of tanks having an input port for introducing air under pressure and a tank output port for releasing said air under pressure into said guide input port of said ringed guide means through conduit means for connecting said tank to said ringed guide means;

generator means fixedly mounted within said frame and operatively connected with said drive shaft for generating electrical energy from the axial rotation of said drive shaft; and controller means for controlling the flow of pressurized air flow released through each of said tank output ports according to a power output reading from said generator means, whereby said controller means is operatively connected to said generator means and to each of said tank output ports.

2. A compressed air engine according to claim 1, further comprising:

a turbine housing for covering said turbine means, wherein said turbine housing has a housing output port for release of air from within said housing.

3. A compressed air engine according to claim 2, further comprising:

a cooling conduit operatively connected with said housing output port for directing said release of air from within said housing out of said turbine housing and toward said generator means.

4. A compressed air engine according to claim 1, wherein each of said plurality of tanks is removably mounted to said frame.

* * * * *